March 5, 1968 — A. BOZSVAI — 3,371,971
BEARING STRUCTURE FOR A VERTICAL MOTOR-GENERATOR UNIT
Filed Feb. 1, 1966 — 2 Sheets-Sheet 1

INVENTOR.
ALEX BOZSVAI
BY
Meyer, Tilberry & Body
ATTORNEYS

March 5, 1968     A. BOZSVAI     3,371,971
BEARING STRUCTURE FOR A VERTICAL MOTOR-GENERATOR UNIT
Filed Feb. 1, 1966     2 Sheets-Sheet 2

INVENTOR.
ALEX BOZSVAI
BY
Meyer, Tilberry & Body
ATTORNEYS

United States Patent Office 3,371,971
Patented Mar. 5, 1968

3,371,971
BEARING STRUCTURE FOR A VERTICAL
MOTOR-GENERATOR UNIT
Alex Bozsvai, Chagrin Falls, Ohio, assignor to The Ohio Crankshaft Company, Cleveland, Ohio, a corporation of Ohio
Filed Feb. 1, 1966, Ser. No. 524,266
12 Claims. (Cl. 308—187)

ABSTRACT OF THE DISCLOSURE

There is provided a bottom end plate for a vertical motor-generator unit which includes a bearing housing connected onto the shaft of the motor and generator and adapted to be slipped into an opening in the bottom end plate. This housing includes a bearing chamber with a lower inlet and an upper opening, a thrust bearing in the chamber, a reservoir around the chamber and in communication with the inlet and means for maintaining a lubricant level in the reservoir above the upper opening. In this manner, the bearing pumps lubricant through the thrust bearing.

Disclosure

This invention pertains to the art of motor-generator units of the type generally used in induction heating installations and more particularly to a bearing structure for a vertical motor-generator unit.

The invention is particularly applicable for use as the bottom bearing of a vertical motor-generator unit including an upper motor and a lower generator, and it will be described with particular reference thereto; however, it will be appreciated that the invention has much broader applications and may be used as a bearing structure for other motor-generator units and other dynamo-electric apparatus.

Motor-generator units, of the type widely used in induction heating installations, are often vertically disposed with the rotor of both the motor and generator mounted on a single vertical shaft. Consequently, the complete weight of the rotary elements, which are quite heavy, is exerted against the bottom bearing of the unit. It is essential that the lower bearing not fail during use because bearing failure can cause substantial damage to the equipment. This is especially obvious when it is realized that the rotary elements of the vertical motor-generator unit may be rotating at a speed in excess of 3600 r.p.m. and may have a weight exceeding 1,000 pounds. In view of these considerations, extensive research has been directed toward the development of a heavy duty, reliable end bearing for use in a vertical motor-generator unit. Prior to the present invention, these heavy duty bearings have been difficult to assemble and service and have included complicated lubricating systems.

These and other disadvantages of prior bearing structures for use at the lower end of a vertical motor-generator unit have been overcome by the present invention which is directed toward an end bearing structure that results in increased durability and lesser assembly time without sacrificing dependability or weight carrying capacity.

In accordance with the present invention, there is provided a bearing structure for supporting the rotary elements in a vertical motor-generator unit having stationary elements and shaft mounted rotary elements. This bearing structure comprises a housing including a generally annular reservoir and a bearing chamber having an upper opening and a lower inlet conduit, a thrust bearing having roller elements supported in the chamber, the roller elements causing a pumping action through the chamber, the opening and inlet conduits being communicated with the annular reservoir, and means for fixedly securing the housing onto the stationary elements of the unit.

In accordance with a more specific aspect of the invention, there is provided a bottom end plate assembly for a vertical motor-generator unit. This end plate assembly comprises a main support casing having an upper surface for supporting the stationary elements of the motor-generator unit, a lower surface adapted to engage a supporting floor, and a central opening with the central opening having an inwardly facing surface. A journal housing is supported on the end of the shaft onto which the rotary elements are secured, and this housing has a bearing for supporting the rotary elements of the unit and an outwardly facing surface generally matching and slightly smaller than the inwardly facing surface of the casing. In this manner, the housing on the shaft may be slipped downwardly into the opening of the casing to provide a blind assembly of the bearing housing at the lower end plate of the unit. Also, there is provided means for securing the housing in the opening to support the rotary elements and means for preventing rotation of the housing with respect to the casing.

The primary object of the present invention is the provision of a bearing structure to be used at the lower end of a vertical motor-generator unit, which bearing structure has a high weight carrying capacity, is easy to assemble, is durable in use, is easily lubricated, and easy to service.

Another object of the present invention is the provision of a bearing structure to be used at the lower end of a vertical motor-generator unit, which bearing structure can be assembled without visually aligning the structure with respect to the remainder of the components adjacent the lower end of the unit.

Another object of the present invention is the provision of a bearing structure to be used at the lower end of a vertical motor-generator unit, which bearing structure includes a novel pumping system to maintain the structure properly lubricated.

Still another object of the present invention is the provision of a bearing structure to be used at the lower end of a vertical motor-generator unit, which bearing structure includes a novel pumping system to maintain the structure properly lubricated and convenient means for periodically cleaning the lubricating system.

Yet another object of the present invention is the provision of a bearing structure to be used at the lower end of a vertical motor-generator unit, which bearing structure includes a sensitive heat indicating feature.

These and other objects and advantages will become apparent from the following description used to illustrate the preferred embodiment of the invention as read in connection with the accompanying drawings in which.

Figure 1:
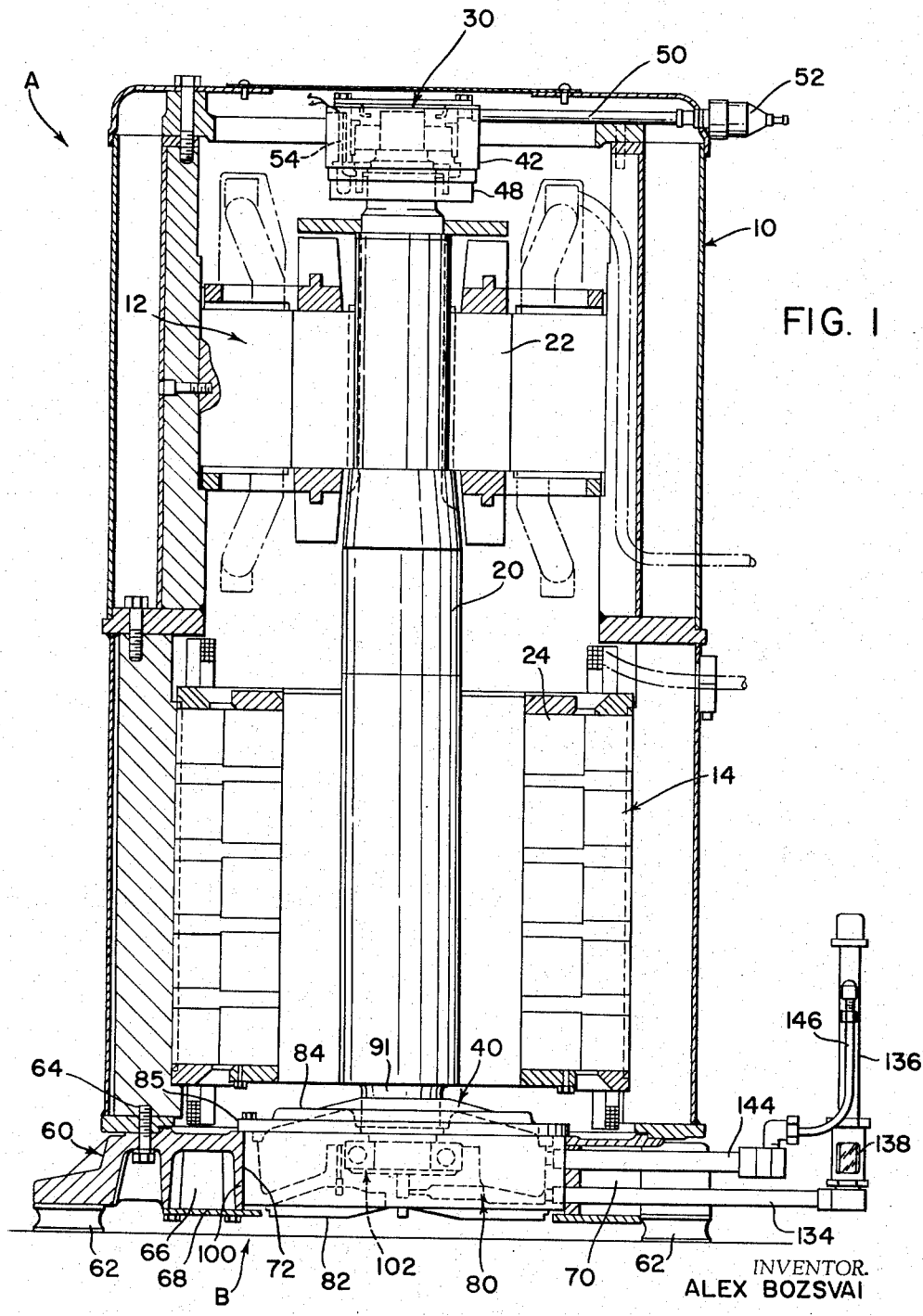
FIGURE 1 is a cross-sectional, side view illustrating, somewhat schematically, the environment of the preferred embodiment of the present invention.

Referring now to the drawings wherein the showings are for the purpose of illustrating a preferred embodiment of the invention only and not for the purpose of limiting same, FIGURE 1 shows a motor-generator unit A mounted on a stationary floor B. The motor-generator unit includes an outer casing 10 surrounding an upper motor 12 and a lower generator 14. A vertically extending shaft 20 is connected onto the motor rotor 22 and the generator rotor 24. An upper or top bearing 30 and a lower or bottom bearing 40 rotatably mounts the shaft and the rotary components secured thereto within the motor-generator unit. Since the details of the motor and generator do not form a part of the present invention, there are not described in detail, and they are illustrated only for the purpose of showing the environment to which the present invention is directed.

Figure 2:
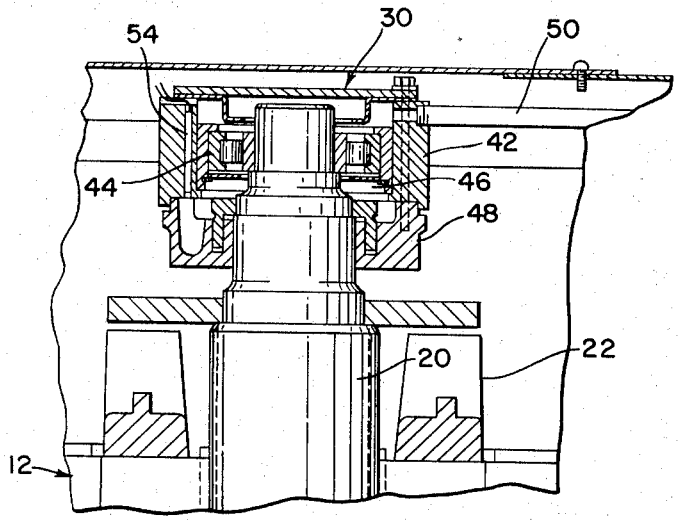
FIGURE 2 is an enlarged cross-sectional view illustrating the upper bearing of the structure shown in FIGURE 1; and, FIGURE 3 is an enlarged cross-sectional view illustrating, somewhat schematically, the preferred embodiment of the present invention.

Referring now to FIGURE 2, the top bearing, which is somewhat conventional, includes a housing 42 for supporting a rotary bearing 44. The housing 42 defines a bearing chamber 46 which is closed by a lower cap 48. Lubricant is forced into the chamber 46 by an appropriately located lubricant line 50 connected onto a lubricant nipple 52, shown in FIGURE 1. To monitor the temperature of the upper bearing 30, there is provided a thermocouple 54 secured within housing 42 and closely adjacent the bearing 44. Top bearing 30 maintains the shaft 20 on a preselected axis; however, this bearing does not provide any substantial weight carrying function. The complete weight of the shaft 20 and the rotary parts secured thereto are carried by the bottom bearing structure 40, which is constructed in accordance with the present invention and which will be heinafter described in detail.

The bottom or lower bearing structure 40, which generally includes the whole portion known as the "end plate," includes an outer casing 60 having downwardly depending legs 62 separated from the casing by cushions 63. The casing is secured onto the motor-generator unit by a plurality of bolts 64. An annular coolant chamber 66 is supplied with coolant from an appropriate coolant system, not shown. The bottom of the coolant chamber is closed with a plate 68 having an inwardly protruding portion 69. For a purpose to be hereinafter explained, the coolant chamber 66 has a hiatus 70 so that the coolant chamber does not extend completely around the casing 60. Casing 60 is provided with an inwardly facing mounting surface 72 for supporting the stationary parts of the motor-generator unit.

Figure 3:
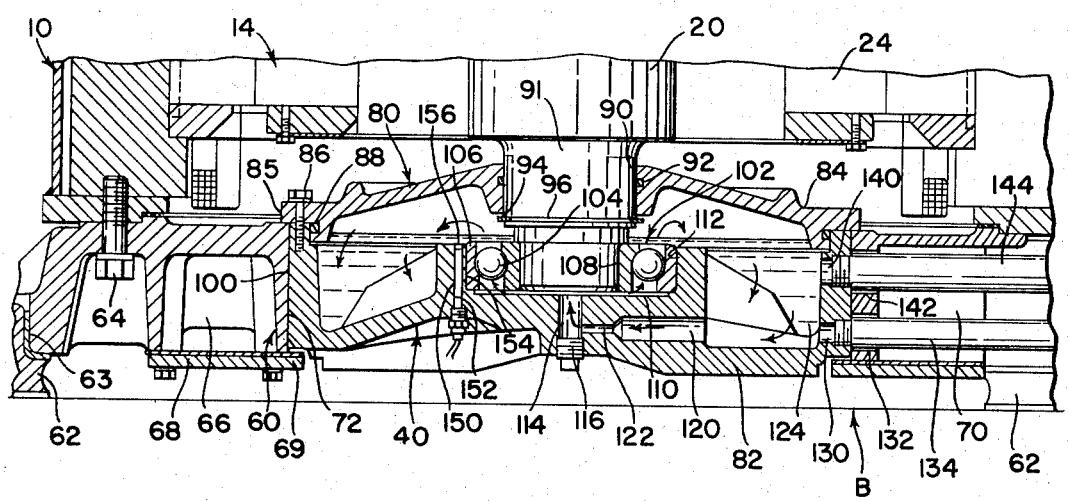

In accordance with the invention, there is provided a central bearing housing 80, best shown in FIGURE 3, which housing includes a bottom casing 82 and upper plate 84 having an over-hanging flange 85. Casing 82 and plate 84 are secured together, as a unit, by a plurality of bolts 86, and the joint between the casing and plate is sealed by an appropriate arrangement, such as an O-ring seal 88. The upper portion of casing 82 is provided with an opening 90 which receives the lower neck 91 of shaft 20. The shaft and opening are sealed by an appropriate arrangement, such as an O-ring seal 92. To secure the housing 80 on the lower end of shaft 20, neck 91 is provided with a snap ring 94 which is received within an annular groove 96. Consequently, when assembled in the manner shown in FIGURE 3, the housing 80 is secured from displacement with respect to the bottom portion of shaft 20. To provide for proper assembly, housing 80 includes an outwardly facing surface 100 generally matching, but smaller than, the inwardly facing mounting surface 72 of casing 60.

By providing the construction described above, assembly of the bearing housing 80 with respect to the casing 60 does not require convenient access to the lower portion of the motor-generator unit. The housing 80 is secured onto the end of the shaft 20, and the shaft is then moved downwardly into the motor-generator unit. The outer surface 100 matches the inner surface 72 so that the shaft 20 may be moved downwardly until flange 85 contacts the casing 60. At that time, the bearing structure is essentially assembled. The ease of assembly is quite apparent from the disclosure.

Referring to more specific features of the present invention, the housing 80 is provided with an inner thrust bearing 102 having roller elements 104, an outer race 106, and an inner race 108. The two races combine with the roller elements to provide a support preventing further downward movement of shaft 20 with respect to housing 80. The particular construction of the bearing is not substantially different from angular contact ball bearings having the general appearance shown in FIGURE 3.

Housing 80 is provided with a chamber 110 for supporting the bearing 102. This chamber includes an upper opening 112 and a lower inlet conduit 114. The downwardmost end of the conduit is closed by a plug 116. Removal of the plug allows easy access to the conduit so that it may be cleaned without disassembling the housing 80. Extending radially outward from conduit 114 is an inlet bore 120 having a metering orifice 122. The diameter of the orifice is selected to provide the appropriate lubricant flow through chamber 110. A supply of lubricant is maintained within the annular reservoir 124 surrounding the bearing 102. The bearing 102 provides a pumping action to force lubricant from reservoir 124, through inlet bore 120 and inlet conduit 114, through chamber 110 and out upper opening 112. This pumping action is automatically controlled by the metering orifice 122. When the bearing is cold, the viscosity of the lubricant within reservoir 124 is relatively high. Consequently, the metering orifice 122 allows a lesser amount of lubricant to flow through the chamber 110. As the temperature of bearing 102 increases, the viscosity of the lubricant within reservoir 124 decreases. This allows a greater amount of lubricant to flow through the metering orifice 122. It is appreciated that the use of a metering orifice automatically controls the amount of lubricant being used by bearing 102. This automatic control maintains the proper lubricant in contact with the bearing 102 at all times since the cold bearing requires less lubricant flow than a warm or hot bearing.

Directly aligned with inlet bore 120 is an opening 130 within housing 80 and a clearance opening 132 within casing 60. A fluid pipe 134 is threaded into opening 130 and extends through opening 132 to a filling stand pipe arrangement 136. Lubricant is maintained within the stand pipe and is supplied to reservoir 124 as it is needed. The level of the lubricant is visible through sight glass 138 within the stand pipe. As more of the lubricant is needed, it is placed within the stand pipe so that the level of lubricant within the reservoir 124 is increased.

To provide a vent for reservoir 124, an opening 140 is formed within housing 80. A clearing opening 142 is aligned with opening 140 so that a fluid pipe 144 may be secured within opening 140, extend through opening 142, and terminate in an appropriate vent arrangement 146. The vent arrangement and lubricant supply system for the bearing structure 40 includes two pipes 134, 144 which are secured onto the housing 80 and extend through clearance openings within casing 60. In this manner, the pipes prevent rotation of the housing with respect to the outer casing. In addition, the opening 130 is aligned with bore 120; therefore, if the bore becomes clogged during operation, it is a simple matter to remove pipe 134 and extend an implement into the bore 120 for the purpose of cleaning the same. This cleaning feature, coupled with the plug 116, provides an efficient arrangement for cleaning the inlet portion of the lubricant pumping system without disassembling the housing 80. This feature forms a substantial portion of the present invention.

As shown in FIGURE 3, a thermocouple 150 is provided within a bore 152 of housing 80. The bore is closely adjacent bearing chamber 110 and is separated from the chamber by a relatively thin wall 154. In this manner, the body of the thermocouple is closely adjacent the bearing chamber so that the temperature of the thermocouple is substantially the same as the temperature of the lubricant within the chamber 110. In accordance with the invention, the bore 152 is provided with a top opening 156. This opening is spaced only a slight distance from the opening 112 of chamber 110. By this structure, lubricant forced outwardly by bearing 102 comes into direct contact with the upper surface of the thermocouple. This again enhances the sensitivity of the thermocouple to the operating temperature of the lubricant within the bearing chamber. The thermocouple may be connected to an appropriate indicator or control arrangement so that the temperature of the bearing 102 may be monitored and controlled.

The present invention has been described in connection with a structural embodiment; however, it will be appreciated that various changes may be made in this embodiment without departing from the intended spirit and scope of the present invention.

Having thus described my invention, I claim:

1. A bottom end plate assembly for a vertical motor-generator unit having stationary elements and a shaft carrying rotary elements, said end plate assembly comprising: a main support casing having an upper surface for supporting the stationary elements of said unit, a lower surface adapted to engage a supporting floor, and a central opening, said central opening having an inwardly facing surface; a journal housing supported on the end of the shaft, said housing having a bearing for rotatably supporting said shaft and an outwardly extending surface generally matching and slightly smaller than said inwardly facing surface whereby said housing on said shaft may be slipped downwardly into said opening of said casing; means for holding said housing in said opening to support said rotary elements; and means for preventing rotation of said housing with respect to said casing, said bearing being mounted within a chamber and including a plurality of roller elements supported by races, said chamber having an upper opening and a lower inlet conduit, said roller elements being arranged to pump lubricant from said inlet conduit through said upper opening, said journal housing having a lubricant reservoir surrounding said chamber, and means for maintaining a level of lubricant in said reservoir, said level being adjacent said upper opening.

2. A bottom end plate as defined in claim 1 wherein said inlet conduit includes a metering orifice whereby the volume of lubricant supplied through said conduit to said bearing chamber is determined primarily by the viscosity of said lubricant.

3. A bottom end plate as defined in claim 2 including an access opening in said housing and aligned with the portion of said conduit having said metering orifice, said housing access opening aligned with a similar access opening in said casing whereby said metering orifice may be cleaned without disassembling the housing from the casing, and means for normally closing said housing and casing access openings.

4. A bottom end plate as defined in claim 3 wherein said means for preventing rotation of said housing includes a rod-like element extending through both of said access openings, said element forming said normally closing means.

5. A bottom end plate as defined in claim 1 including an access opening in said housing and aligned with a portion of said conduit, said housing access opening aligned with a similar access opening in said casing whereby said portion of said conduit may be cleaned without disassembling the housing from the casing, and means for normally closing said housing and casing access openings.

6. A bottom end plate as defined in claim 5 wherein said means for preventing rotation of said housing includes a rod-like element extending through both of said access openings, and said elements forming said normally closing means.

7. A bottom end plate as defined in claim 6 wherein said rod-like element includes an inlet pipe for supplying lubricant to said conduit.

8. A bottom end plate as defined in claim 1 including a bore extending into said housing closely adjacent said chamber, said bore having an uppermost opening closely adjacent said upper opening of said chamber, and a thermocouple mounted in said bore with a body portion in said bore and a top portion adjacent said uppermost opening whereby lubricant issuing from said upper opening impinges on said top portion of said thermocouple.

9. A bearing structure for supporting the rotary elements in a vertical motor-generator unit having stationary elements and shaft mounted rotary elements, said structure comprising: a housing including a generally annular reservoir and a chamber having an upper opening and a lower inlet conduit, a thrust bearing having roller elements supported in said chamber, said roller elements causing a pumping action through said chamber, said upper opening and said lower inlet conduit communicated with said annular reservoir, means for maintaining a level of lubricant in said reservoir, said level being adjacent said upper opening and means for fixedly securing said housing onto said stationary elements.

10. A bearing structure as defined in claim 9 wherein said inlet conduit includes a metering orifice whereby the volume of lubricant supplied through said conduit to said bearing chamber is determined primarily by the viscosity of said lubricant.

11. A bearing structure as defined in claim 9 wherein said means for securing said housing includes a fluid pipe extending from one of said stationary elements to said reservoir.

12. A bearing structure as defined in claim 9 including a bore extending into said housing closely adjacent said chamber, said bore having an uppermost opening closely adjacent said upper opening of said chamber, and a thermocouple mounted in said bore with a body portion in said bore and a top portion adjacent said uppermost opening whereby lubricant issuing from said upper opening impinges on said top portion of said thermocouple.

References Cited
UNITED STATES PATENTS 1,992,818    2/1935    Else _____ 308—187

MARTIN P. SCHWADRON, *Primary Examiner.*

FRANK SUSKO, *Examiner.*